Jan. 11, 1949.  C. S. WEYANDT  2,458,545
PERMANENT MAGNET VIBRATORY MOTOR
Filed Dec. 19, 1946

INVENTOR.
Carl S. Weyandt
BY William D. Carothers
his Atty.

Patented Jan. 11, 1949

2,458,545

UNITED STATES PATENT OFFICE 2,458,545

PERMANENT MAGNET VIBRATORY MOTOR

Carl S. Weyandt, Homer City, Pa.

Application December 19, 1946, Serial No. 717,146

6 Claims. (Cl. 172—126)

This invention relates generally to a vibratory motor and more particularly to a vibratory motor having a permanent magnet armature.

Vibratory motors operated directly from prevailing commercial frequencies of from 50 to 60 cycle, must be mechanically tuned to have a natural period of vibration close to the frequency of the current pulsations from which they are energized, or they will not provide vibratory energy efficiently, and it is difficult to maintain the tuning of the mechanical system at such commercial frequency.

Different modes have been devised to reduce the frequency of impulses of vibration to frequencies of a lower order, which enables the provision of stable mechanically tuned systems.

Motor generator frequency changes, interrupters and half wave rectifiers have been employed to reduce the frequency of impulses for the operation of vibratory motors.

Vibratory motors of this character are ordinarily provided with an electromagnetic field member comprising a coil mounted on a core structure and held in spaced relation with an armature structure resiliently mounted to vibrate by electromagnetic pulsations. When the coil of the field member is energized with an alternating current, the armature member is attracted by each current impulse and retracted by the resilient element to cause it to vibrate at a frequency which is equal to the frequency of the current pulsations. When a half wave rectifier of any desired character is placed in series with the field winding and energized from a 60 cycle source of supply, the armature will vibrate 3600 times per minute. Such vibrators serve a wide market and are extensively used. The vibratory motor comprising this invention is designed to deliver 3600 vibrations per minute when operated from a 60 cycle current, but does not require the use of auxiliary apparatus such as a half wave rectifier or other impulse reducing devices in obtaining this lower frequency.

The principal object of this invention is the provision of a vibratory motor arranged to deliver the same number of vibrations as the frequency of the electric current employed to operate the same without the use of an auxiliary current impulse reducing apparatus.

Another object is the provision of an electromagnetic vibratory motor inherently capable of producing mechanical vibrations of higher amplitude and lower frequencies.

Another object is the provision of an electromagnetic vibratory motor operable by an alternating current and having a field member and an armature member, one of which is arranged to produce an alternating magnetic field and the other a unidirectional magnetic field, so that they attract and repel each other during each cycle of the alternating current supply.

Another object is the provision of a vibratory motor having a massive permanent magnet armature arranged to efficiently produce heavy vibrations without contact.

Another object is the provision of an electromagnetic vibratory motor having a permanent magnet armature and arranged for mounting on the object to be vibrated.

Other objects and advantages will appear hereinafter in the following description and claims.

A practical embodiment illustrating the principles of this invention is shown in the accompanying drawings wherein.

Figure 1:
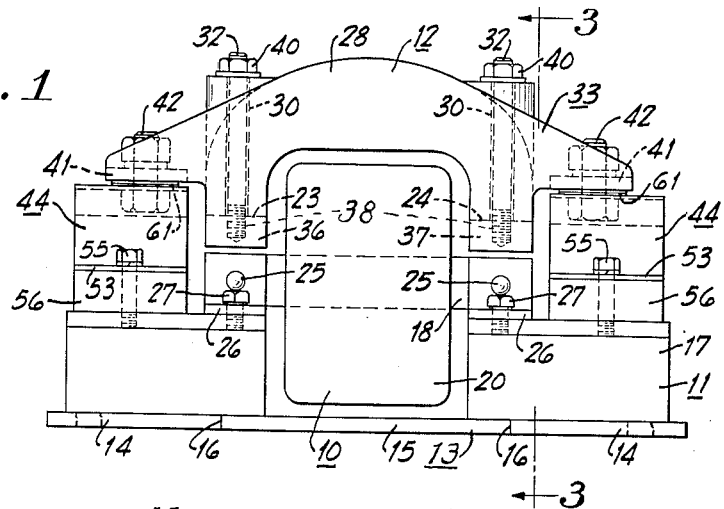
Fig. 1 is a view in side elevation of the vibratory motor comprising this invention.
Figure 2:
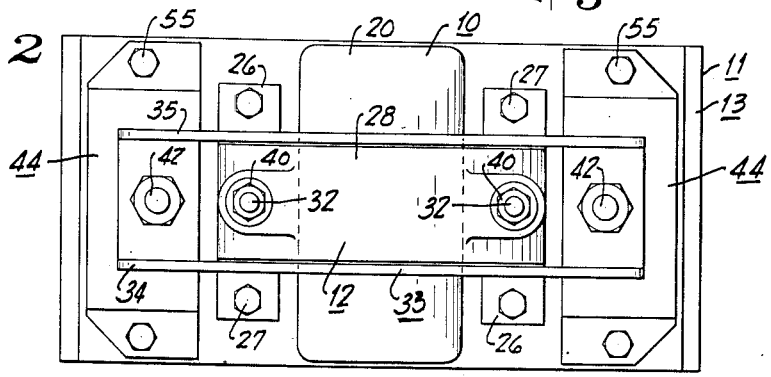
Fig. 2 is a plan view of the structure shown in Fig. 1.
Figure 3:
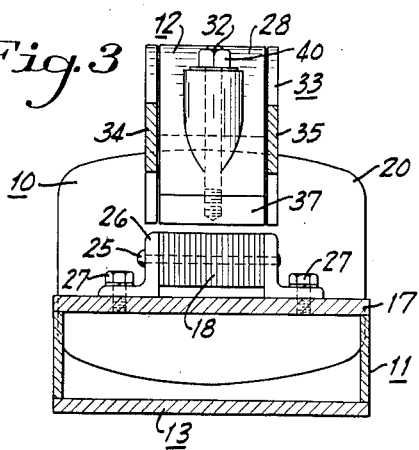
Fig. 3 is a sectional view taken on the line 3, 3 of Fig. 1.
Figure 4:
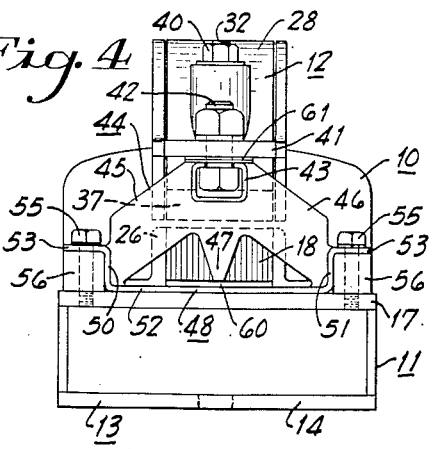
Fig. 4 is an end elevation of the motor shown in Fig. 1.

Referring to the drawings, the vibratory motor comprises the field member 10 mounted on the base 11 arranged to resiliently support the armature 12 to provide a magnetic coupling between the field and the armature members.

The base 11 may be made up of a metal plate 13, the end sections 14 of which are spaced by a section 15 of non-magnetic material such as a non-magnetic steel. The end sections 14 may be secured to the section 15 by means of welding as indicated at 16. Spaced box members 17 are welded or otherwise secured to the base plate 13 in spaced relation to each other. The inner ends of the box members 17 preferably bridge the welded joints 16 as indicated in Fig. 1.

The ends of the straight motor field core member 18 are mounted on the adjacent ends of the box member 17 for the purpose of carrying the field coil member 20 therebetween, which coil is wound or otherwise mounted on the core 18 and secured thereto. The core memebr. 18 may be made up of a bar of magnetic iron or a series of soft iron laminations secured together. The ends of the core member 18 are provided with transverse holes to receive the rivets 25 which are employed to mount the core member between the angle brackets 26. The angle brackets 26 are in turn secured to the tops of the box members 17 by means of the bolts 27. The box members are sufficiently high to support the coil 20 on its core 18 in spaced relation with the base plate 13.

The armature member 12 comprises a substantially U-shaped permanent magnet 28 which is preferably made of a magnetic material such as that known as "Alnico" or "Magnico." This permanent magnet may be cast or otherwise formed with the vertical openings 30 in the legs of the magnet to receive the clamping bolts 32. The magnet 28 is carried in a cradle frame 33 made up of the side walls 34 and 35 connected on the underside by the spaced bridge members 36 and 37 which are aligned with the pole faces 23 and 24 respectively of the permanent magnet.

Only the pole members 36 and 37 of the frame 33 are made of magnetic material and their upper faces are ground and are provided with centrally disposed tapped holes 38 for receiving the stud clamping bolts 32. The upper faces of the pole members 36 and 37 together with the poles of the permanent magnet are finished and mounted in assembled relation with the stud bolts 32 passing upwardly through the openings 30 and the nuts 40 are screwed thereon for the purpose of tightly clamping the permanent magnet in the frame 33.

The side walls 34 and 35 of the frame 33 are extended beyond the legs of the permanent magnet 28 and are connected by the transverse plates 41 which provide bracket means for the support of the armature member 12. Each of the plates 41 is provided with a centrally disposed opening for receiving the stems of the bolts 42, the heads of which are arranged to slide under the inturned flanges of the upwardly open channel members 43 of the resilient supporting spring members 44.

These resilient supporting spring members are molded to provide the outwardly and downwardly projecting leg sections 45 and 46 and an intermediate depending snubber section 47. The leg sections are preferably of uniform cross section for their full extent but the cross section of the depending snubber preferably becomes smaller toward its lower or free end which is adjacent to but spaced from the lower bracket member 48. This snubber section is preferably of truncated form to provide proper characteristics in snubbing the action of the armature which it supports. However, the snubber section may be made in other forms.

The lower extremities of the leg sections 45 and 46 of the resilient support member 44 are likewise vulcanized to the oppositely disposed vertical surfaces 50 and 51 and to portions of the top surface of the intermediate section 52 of the bracket member 48 to provide an integral or unitary bracket support. The vertical wall surfaces 50 and 51 of the bracket 48 are preferably shorter than the ends of the leg sections 45 and 46 to permit the latter to have more freedom for flexing and deforming when subjected to a compressive force.

The upper ends of the vertical wall sections 50 and 51 of the bracket 48 are provided with outwardly projecting flanges 53 which are provided with openings for receiving the clamping bolts 55 which are threadably received in the aligned threaded openings on the top of the box members 17. Spacer blocks 56 have openings to pass the bolts 55 and are placed under the outwardly projecting flanges 53 to provide vertical and lateral support of the resilient support members 44.

It will be noted that where the rubber surfaces intersect and are vulcanized to the metal parts of the upwardly open channel 43 and the bracket member 48, a fillet of rubber is formed to seal and protect the vulcanized joints.

These rubber supporting spring members 44 are flexible in design for the purpose of obtaining different spring characteristics without changing their general configuration. The dependent snubber section 47 may be made in different cross-sectional sizes to provide different snubber characteristics when it engages the intermediate section 52 of the bracket 48 as the armature is attracted by the field member, causing the resilient spring support member 44 to flex during operation. Thus the size of the gap 60 between the snubber 47 and the bracket 48, together with the flexing of the legs 45 and 46 and the resiliency of the snubber, determine the limit of the amplitude of the vibration of the armature. However, in no instance is the armature permitted to have an amplitude sufficient to strike the ends of the core member 18.

This resilient support 44 thus provides a unitary spring member in the form of a bridge, with an intermediate resilient snubber member and it may be properly tuned to provide the most desirable vibratory characteristics of the armature which is free or unloaded. The spring supports 44 are tuned to have a natural period of vibration approximating that of the frequency of the alternating supply current.

Shims 61 are placed between the underside of the plates 41 and the top of the resilient spring members 44 to properly adjust the air gap between the armature 12 and the core of the field member 10.

The large U-shaped permanent magnet armature member provides a heavy mass which, when vibrated at a frequency equal to that of the alternating current supply, exerts its force of inertia through the resilient support members 44 to the base 13 when the polarity of the core 18 is opposite to the polarity of the permanent magnet armature member 12 causing the latter to be attracted to the core 18. In the next half cycle of the alternating current supply, the polarity of the core 18 is the same as that of the permanent magnet causing the latter to be magnetically repulsed which action combined with the reaction of the supporting spring members, creates a resultant force in the opposite direction on the armature.

The electrical forces are thus employed in both directions, which together with the massive armature, produce a more efficient vibratory motion that is equal to the frequency of the alternating current supply.

I claim:

1. In a vibratory motor, the combination of a straight electromagnetic core member, a field winding mounted on the core with their axes coincident to provide spaced pole members when the winding is energized with an alternating current supply, a massive permanent magnet armature providing a strong magnetic force, resilient means supporting the armature as an unloaded body in operative spaced relation relative to the core member to permit the armature to vibrate with a greater amplitude and at the same frequency as the alternating current supply, a flat base, and means on the base at each end of the field winding to support the ends of the core.

2. In a vibratory motor, the combination of a straight electromagnetic core member, a field winding mounted on the intermediate section of the core with their axes coincident to provide spaced pole members when the winding is energized with an alternating current supply, a massive U-shaped permanent magnet armature providing a strong magnetic force, and resilient spring means supporting the ends of the armature as an unloaded body in operative spaced relation relative to the poles of the core member to permit the armature to vibrate through a large amplitude at the same frequency as the alternating current supply.

3. In a vibratory motor, the combination of a straight electromagnetic core member, a field winding mounted on the intermediate section of the core with their axes coincident to provide spaced pole members when the winding is energized with an alternating current supply, a cradle frame, a massive U-shaped permanent magnet armature providing a strong magnetic force cradled in and clamped to the frame, and resilient spring means supporting the ends of the frame to suspend the poles thereof in operative spaced relation relative to the poles of the core member to permit the armature and frame to vibrate as a free massive body at the same frequency as the alternating current supply.

4. In a vibratory motor, the combination of a straight electromagnetic core member, a field winding mounted on the intermediate section of the core with their axes coincident to provide spaced pole members when the winding is energized with an alternating current supply, a cradle frame having transverse pole faces, a massive U-shaped permanent magnet armature providing a strong magnetic force cradled in and clamped to the frame with the pole faces of the armature mating with the transverse pole faces of the frame, and resilient means supporting the ends of the frame to suspend the transverse poles thereof in operative spaced relation relative to the poles of the core member to permit the armature and cradle frame to vibrate as a unit at the same frequency as the alternating current supply.

5. In a vibratory motor, the combination of a base, a straight core member secured to the base, an electromagnetic coil encircling and attached to the core member with their axes coincident to provide pole faces at opposite ends thereof, said coil being arranged to be energized from a source of alternating current, a permanent magnet armature providing a strong magnetic field, and resilient means carried by the base for supporting the armature with its poles in operative spaced relation relative to the poles of the core member to permit the armature to vibrate with a greater amplitude and at the same frequency as the alternating current supplied, said resilient means being tuned close to the frequency of the alternating current supply.

6. In a vibratory motor, the combination of a base, a core member secured to the base, an electromagnetic coil encircling and attached to the core member to provide pole faces at opposite ends thereof, said coil being arranged to be energized from a source of alternating current, a permanent magnet armature providing a strong magnetic field, pole faces of magnetic material attached to the poles of the permanent magnet armature, a frame of nonmagnetic material secured to said pole faces, and resilient means for supporting said frame to position the pole faces in operative spaced relation to the poles of the core member to permit the armature to vibrate with greater amplitude and at the same frequency as the alternating current supplied, said resilient means being tuned close to the frequency of the alternating current supply.

CARL S. WEYANDT.

REFERENCES CITED

The following references are of record in the file of this patent:

UNITED STATES PATENTS

| Number | Name | Date |
|---|---|---|
| 2,206,244 | Weyandt | July 2, 1940 |
| 2,305,943 | Weyandt | Dec. 22, 1942 |